(12) United States Patent
Takizawa et al.

(10) Patent No.: US 10,294,880 B2
(45) Date of Patent: May 21, 2019

(54) ENGINE CONTROL APPARATUS TO PREDICT ENGINE SPEED ACCURATELY

(71) Applicant: DENSO CORPORATION, Kariya, Aichi-pref. (JP)

(72) Inventors: Tomohiro Takizawa, Kariya (JP); Shinsuke Kawazu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/097,606

(22) Filed: Apr. 13, 2016

(65) Prior Publication Data

US 2016/0305355 A1    Oct. 20, 2016

(30) Foreign Application Priority Data

Apr. 17, 2015    (JP) .................. 2015-084912

(51) Int. Cl.
| | |
|---|---|
| *F02D 41/00* | (2006.01) |
| *F02N 11/08* | (2006.01) |
| *F02N 19/00* | (2010.01) |
| *F02N 11/10* | (2006.01) |
| *F02N 15/06* | (2006.01) |

(52) U.S. Cl.
CPC ...... *F02D 41/0097* (2013.01); *F02N 11/0844* (2013.01); *F02N 11/0851* (2013.01); *F02N 11/087* (2013.01); *F02N 11/101* (2013.01); *F02N 11/105* (2013.01); *F02N 15/067* (2013.01); *F02N 19/005* (2013.01); *F02N 2200/022* (2013.01); *F02N 2250/04* (2013.01); *Y02T 10/48* (2013.01)

(58) Field of Classification Search
CPC ............. F02D 41/0097; F02N 11/0844; F02N 2200/022; F02N 19/005; Y02T 10/48
See application file for complete search history.

(56) References Cited

U.S. PATENT DOCUMENTS

| | | | |
|---|---|---|---|
| 9,170,176 B2 * | 10/2015 | Roessle | .................. F02D 41/009 |
| 2006/0081207 A1 * | 4/2006 | Nakamura | .......... F01L 13/0026 123/179.3 |
| 2011/0056450 A1 * | 3/2011 | Notani | ................ F02N 11/0855 123/179.4 |

(Continued)

FOREIGN PATENT DOCUMENTS

| | | |
|---|---|---|
| EP | 1 602 811 A2 | 12/2005 |
| JP | 2005-344565 A | 12/2005 |

*Primary Examiner* — Joseph J Dallo
*Assistant Examiner* — Kurt Philip Liethen
(74) *Attorney, Agent, or Firm* — Oliff PLC

(57) ABSTRACT

An engine control apparatus predicts the speed of an engine in a normal rotation range as a function of a loss energy in an engine rotation pulsating period and also predicts the speed of the engine in a reverse rotation range as a function of a pumping loss component and a loss energy which is derived by reversing the sign of a value of a friction component that is a portion of the loss energy in the normal rotation range and arises from mechanical friction to which the piston is subjected during stroke thereof. The pumping loss component is an energy loss occurring in the intake stroke of the engine. This calculation enhances the accuracy in predicting a future engine speed between start of a drop in speed of the engine resulting from stop of combustion of fuel and stop of rotation of the engine.

3 Claims, 5 Drawing Sheets

(56) References Cited

U.S. PATENT DOCUMENTS

| | | | |
|---|---|---|---|
| 2011/0137544 A1* | 6/2011 | Kawazu | F02N 11/0855 |
| | | | 701/113 |
| 2012/0029797 A1* | 2/2012 | Notani | F02N 11/0844 |
| | | | 701/113 |
| 2014/0107903 A1 | 4/2014 | Kawazu et al. | |
| 2016/0252020 A1* | 9/2016 | Takahashi | G01M 15/042 |
| | | | 701/105 |

* cited by examiner

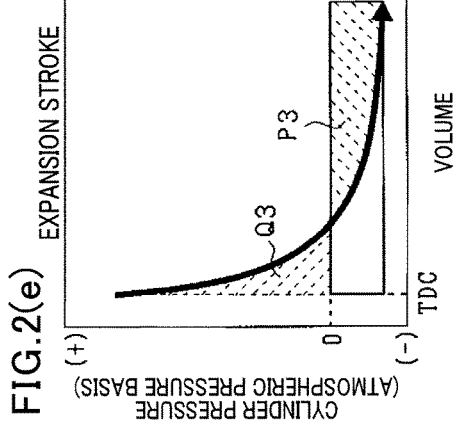
FIG.2(a)
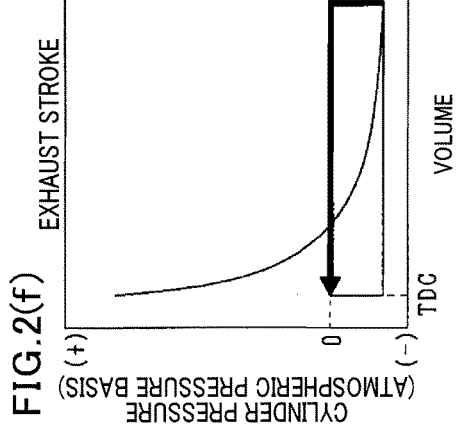
FIG.2(c)
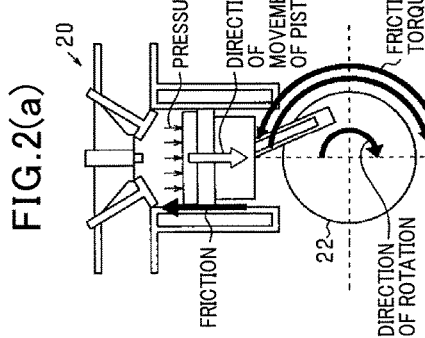
FIG.2(b)
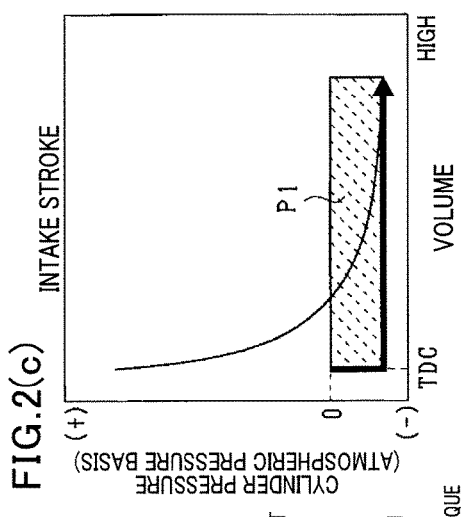
FIG.2(d)
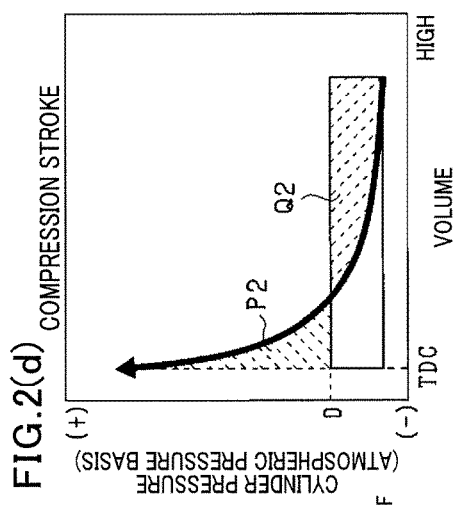
FIG.2(e)
FIG.2(f)

ENGINE CONTROL APPARATUS TO PREDICT ENGINE SPEED ACCURATELY

CROSS REFERENCE TO RELATED DOCUMENT

The present application claims the benefit of priority of Japanese Patent Application No. 2015-84912 filed on Apr. 17, 2015, the disclosure of which is incorporated herein by reference.

BACKGROUND

1 Technical Field

This disclosure relates generally to an engine control apparatus which may be employed in automotive vehicles, and more particularly to such an engine control apparatus which is engineered to predict or calculate a rotational speed of an internal combustion engine within a period of time between start of a drop in speed of the engine resulting from stop of combustion of fuel in the engine and stop of revolution of the engine.

2 Background Art

Engine control systems for automotive vehicles are known which have an idle-stop function to monitor a driver's operation, such as an accelerating operation or a braking operation to start or stop the vehicle, to automatically stop or restart an engine mounted in the vehicle. Such automatic engine stop and restart control are usually done to reduce the consumption of fuel in the engine.

Japanese Patent First Publication No. 2014-77399 teaches an automatic engine stop and restart system which, when an engine restart request is made while the speed of the engine is decreasing in an automatic engine stop mode, restarts the engine as quickly as possible without waiting for complete stop of the engine. Specifically, when the engine restart request is made, the automatic engine stop and restart system works to predict the speed of the engine after a lapse of a period of time required to move a pinion of an engine starter and achieve mesh with a ring gear joined to an output shaft of the engine and then control the operation of the engine starter.

The above publication also teaches calculating a loss of energy during reverse rotation of the engine from a loss of energy during normal rotation of the engine to predict the speed of the engine in a reverse rotation range. In the prediction of the speed of the engine in the reverse rotation range, the loss of energy in a normal rotation range is broken down into a frictional component and a compression component. The positive and negative signs of the friction component are reversed, while the sum of the compression component over all strokes of the engine is assumed to be zero.

However, the assumption of the sum of the compression component over all the strokes of the engine as being zero in predicting the speed of the engine, however, results in a concern that the accuracy in predicting the speed of the engine decreases with an increase in compression component. The decreased prediction accuracy may result in a failure in meshing the pinion with the ring gear in an engine speed range permissible in terms of noise rising from the meshing of the pinion gear with the ring gear or mechanical wear of the pinion gear and the ring gear, which will lead to an increase in such noise or premature mechanical wear when the engine is restarted.

SUMMARY

It is therefore an object to provide an engine control apparatus which is engineered to enhance the accuracy in predicting or calculating the speed of an engine with a period of time between start of a drop in speed of the engine resulting from stop of combustion of fuel in the engine and stop of revolution of the engine.

According to one aspect of an embodiment, there is provided an engine control apparatus which works to predict a speed of an engine in a period of time between start of a drop in speed of the engine resulting from stop of combustion of fuel in the engine and stop of rotation of the engine. The engine control apparatus comprises: (a) a first calculator which predicts a future speed of the engine in a normal rotation range thereof as a function of a loss energy in a latest one of engine rotation pulsating periods each of which corresponds to a cycle of a change in speed of the engine arising from increasing and decreasing of volume of a cylinder of the engine; (b) an energy calculator which reverses a positive or negative sign of a value of a friction component that is a portion of the loss energy in the normal rotation range and arises from mechanical friction to which a piston of the engine is subjected during stroke thereof and calculates a loss energy in a reverse rotation range of the engine as a function of the value of the friction component whose sign has been reversed and a pumping loss component that is an energy loss occurring in an intake stroke of the engine; and (c) a second calculator which predicts a future speed of the engine in the reverse rotation range of the engine based on the loss energy derived by said energy calculator.

The friction component that is of a loss energy generated in the engine between the start of drop in speed of the engine resulting from the stop of burning the fuel in the engine and the stop of rotation of the engine, a component caused by the mechanical friction the piston will experience during stroke thereof acts in opposite directions between the normal rotation and reverse rotation of the engine. The compression component resulting from a change in pressure in the cylinder of the engine may be expressed by the pumping loss component that is an energy loss occurring during the intake stroke in the engine. The engine control apparatus is engineered based on the above fact and enhances the accuracy in calculating the energy loss in the reverse rotation of the engine, which will result in improved accuracy in predicting a future speed of the engine in the reverse rotation range.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings:

FIG. 2(a) is a sectional view which demonstrates a stroke of a piston in a cylinder of an engine from a top dead center to a bottom dead center;

FIG. 2(b) is a sectional view which demonstrates a stroke of a piston in a cylinder of an engine from a bottom dead center to a top dead center;

FIG. 2(c) is a view which demonstrates a relation between the pressure in a cylinder and the volume of the cylinder during an intake stroke of a piston of an engine;

FIG. 2(d) is a view which demonstrates a relation between the pressure in a cylinder and the volume of the cylinder during a compression stroke of a piston of an engine;

FIG. 2(e) is a view which demonstrates a relation between the pressure in a cylinder and the volume of the cylinder during an expansion stroke of a piston of an engine;

FIG. 2(f) is a view which demonstrates a relation between the pressure in a cylinder and the volume of the cylinder during an exhaust stroke of a piston of an engine;

DESCRIPTION OF THE PREFERRED EMBODIMENTS

Figure 1:
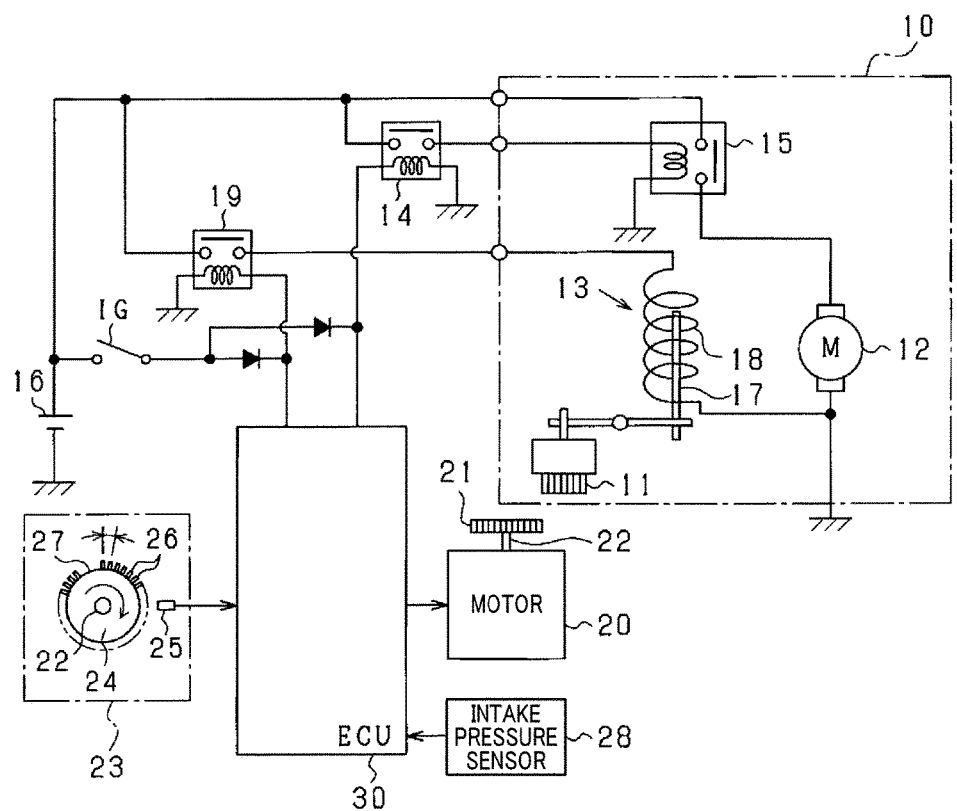
FIG. 1 is a circuit diagram which illustrates an engine control apparatus according to an embodiment.

Referring to the drawings, wherein like reference numbers refer to like parts in several views, particularly to FIG. 1, there is shown an engine control system of an embodiment which is used with a four-cycle four-cylinder engine. The engine control system (which will also be referred to as an engine control apparatus below) is implemented by an electronic control unit (ECU) and works to perform a fuel injection control task, an ignition timing control task, and an automatic engine stop and restart task.

A starter device 10 is, as illustrated in FIG. 1, designed as a pinion-push type engine starter and includes a pinion 11, an electric motor 12, and an electromagnetic actuator 13. The motor 12 works to rotate the pinion 11. The electromagnetic actuator 13 works as an electrically-driven actuator to push the pinion 11 in an axial direction thereof. The motor 12 is connected to a battery 16 through a motor energizing relay 15. When a switching device of the motor energizing relay 15 is closed, the battery 16 delivers electric power to the motor 12. The motor energizing relay 15 has a coil connected to a motor drive relay 14 which is opened or closed in response to an electrical signal. The switching device of the motor energizing relay 15 is closed when a closing signal is inputted to the motor drive relay 14, thereby supplying the power from the battery 16 to the motor 12.

The electromagnetic actuator 13 includes a plunger 17 and a coil 18. The plunger 17 transmits a drive force (i.e., torque) to the pinion 11 through a lever. When energized, the coil 18 works to move the plunger 17 in an axial direction thereof. The electromagnetic actuator 13 is electrically connected to the battery 16 through a pinion drive relay 19. The pinion drive relay 19 is opened or closed in response to an electric signal which is different from one outputted to the motor drive relay 14. In other words, the rotation of the pinion 11 achieved by the motor 12 and the thrust of the pinion 11 achieved by the electromagnetic actuator 13 are controlled independently from each other.

The pinion 11 is placed at a location where when the pinion 11 is moved, teeth thereof are brought into engagement with the ring gear 21 coupled to an output shaft (i.e., a crankshaft 22) of the engine 20. Specifically, when the electromagnetic actuator 13 is not energized, the pinion 11 is placed in non-contact with the ring gear 21. When the pinion drive relay 19 is turned on or closed when the pinion 11 is in non-contact with the ring gear 21, the electromagnetic actuator 13 is supplied with power from the battery 16 and attracts the plunger 17 in the axial direction thereof, thereby pushing the pinion 11 toward the ring gear 21. This causes each of teeth arranged on an outer periphery of the pinion 11 to enter between adjacent two of teeth arranged on an outer periphery of the ring gear 21 to establish mechanical mesh between the pinion 11 and the ring gear 21. When the motor 12 is excited when the pinion 11 meshes with the ring gear 21, it will cause the ring gear 21 to be rotated by the pinion 11 to exert an initial torque on the engine 20, thereby cranking the engine 20.

The engine control system also includes a crank angle sensor 23 which outputs a rectangular signal at an interval of a given crank angle of the engine 20. The crank angle sensor 23 is equipped with a pulsar (i.e., a rotational disc) 24 and an electromagnetic pick-up 25. The pulsar 24 rotates along with the crankshaft 22. The electromagnetic pick-up 25 is disposed near the outer circumference of the pulsar 24. The pulsar 24 has formed on a circumference thereof a plurality of protrusions 26 which are arranged at an interval of a given rotational angle (e.g., 30° C.A) away from each other and an even area 27 where there are no protrusions, e.g., the two protrusions 26 are omitted.

When the pulsar 24 rotates following the rotation of the crankshaft 22, the electromagnetic pickup 25 outputs a pulse signal (which will also be referred to as a crank pulse signal below) each time one of the protrusions 26 reaches or passes the electromagnetic pickup 25, that is, at an interval of 30° C.A in this embodiment. The ECU 30 analyzes the pulse signal, as inputted from the electromagnetic pickup 25, and determines the speed and angular velocity of the crankshaft 22 of the engine 20 as a function of a width of the pulse signal. The ECU 30 also counts the number of the pulse signals, as inputted sequentially, to determine the crank angle or angular position of the crankshaft 22.

The ECU 30 works as an electronic controller equipped with a typical microcomputer to monitor or analyze outputs from sensors installed in the engine control system for controlling the quantity of fuel to be sprayed into the engine 20, the ignition timing, the operation of the engine 20, for example, in an idle stop mode, and the operation of the starter device 10. The sensors installed in the engine control system include the crank angle sensor 23, an intake pressure sensor 28, and a coolant temperature sensor (not shown). The intake pressure sensor 28 measures the pressure in an intake pipe connecting with the engine 20. The coolant temperature sensor works to measure the temperature of cooling water or coolant for the engine 20.

The idle stop control operation (also called an automatic engine stop and restart operation) to be executed by the engine control system of this embodiment will be described below. The idle stop control operation is to automatically stop the engine 20 when an automatic engine stop condition(s) is met during an idle mode of operation of the engine 20 and then restart the engine 20 when an automatic engine restart condition(s) is met. For instance, the automatic engine stop condition is any of conditions where the accelerator (e.g., the accelerator pedal) of the vehicle has been released fully, that is, the engine 20 is idling, where the brake pedal has been depressed, and where the speed of the vehicle 20 has dropped below a given value. The automatic engine restart condition is either of conditions where the accelerator has been depressed and where the brake pedal has been released fully.

The engine control system of this embodiment is so designed to restart the engine 20 as quickly as possible without waiting for the engine 20 to stop completely when the automatic engine restart condition is satisfied in a period of time when the speed of the engine 20 is dropping following an automatic stop of the engine 20.

Specifically, when the automatic engine stop condition is encountered, the engine control system works to stop combustion of the fuel in the engine 20. When the automatic engine restart condition is met during a period of time in which the speed of the engine 20 is dropping following the stop of burning of fuel in the engine 20, the engine control system outputs an on-signal to the pinion drive relay 19 at a time set as a function of the speed of the engine 20 (e.g., when the speed of the engine 20 has fallen in a low-speed range of 100 rpm or less). This causes the coil 18 to be energized to thrust the pinion 11 toward the ring gear 21. After a given period of time (which will also be referred to as a travel time Tp below) has passed since the pinion 11 was thrust, the engine control system outputs the on-signal to the motor drive relay 14. The travel time Tp is an amount of time required between when the pinion 11 starts to be moved and when the pinion 11 travels to and contacts with the ring gear 21. The output of the on-signal to the motor drive relay 14 after a lapse of the travel time Tp causes the pinion 11 which has engaged with the ring gear 21 to be rotated to crank the engine 20 without having to wait for the engine 20 to stop completely.

The engagement of the pinion 11 with the ring gear 21 is preferably achieved when a relative speed of the ring gear 21 to the pinion 11 is in a given range of, for example, 0±100 rpm in order to minimize mechanical noise arising from the engagement therebetween or wear of teeth thereof. Before the pinion drive relay 19 is closed, the pinion 11 is located away from the ring gear 21. It, thus, takes time to move the pinion 11 and contact the pinion 11 with the ring gear 21. Therefore, if the pinion 11 starts to be moved at the moment of satisfaction of the automatic engine restart condition when the speed of the engine 20 is in a range where the pinion 11 and the ring gear 21 are permitted to be engaged, it may cause the speed of the engine 20 to lie out of such a permissible range at a time when the pinion 11 actually engages with the ring gear 21. This results in concern about an increase in mechanical noise arising from the engagement between the pinion 11 and the ring gear 20 or wear of teeth thereof.

Moreover, the crank angle sensor 23 that is of an electromagnetic pickup type usually has a limited engine speed range in which a pulse signal (which will also be referred to as a crank pulse signal below) can be produced and can not measure the speed of the engine 20 accurately, especially in a low-speed range of, for example, 50 rpm or less. Use of an output from the crank angle sensor 23 in controlling the operation of the starter device 10 may, therefore, result in a deterioration of the controllability of the engine control system in the low-speed range.

In order to alleviate the above problems, the ECU 30 is engineered to estimate or calculate a future speed of the engine 20 in a period of time between when the speed of the engine 20 starts dropping and when the engine 20 stops completely and determine the time when the pinion 11 is to start to be moved and the time when the motor 12 is to start to be actuated as a function of the calculated future speed of the engine 20. Specifically, the engine control system is equipped with a first calculator which serves as rotation calculating means to calculate the speed of the engine 20 after the fuel combustion in the engine 20 stops and when the crankshaft 22 is rotating in the forward direction (i.e., the normal direction) and a second calculator which serves as rotation calculating means to calculate the speed of the engine 20 after the fuel combustion in the engine 20 stops and when the crankshaft 22 is rotating in the reverse direction.

First Calculator

The first calculator defines each cycle of a change in speed of the engine 20 arising from increasing and decreasing of volume of a cylinder (i.e., a combustion chamber) of the engine 20 as an engine speed prediction period of time (which will also be referred to as an engine rotation pulsating period below) and calculates or predict a future speed of the engine 20 during rotation of the engine 20 in the forward direction (i.e., in a normal rotation range) as a function of a loss of energy in the engine 20 in a preceding one (i.e., a latest one) of the engine rotation pulsating periods.

Specifically, the engine 20 in this embodiment is, as described above, a four-cycle four-cylinder internal combustion engine. If the engine 20 is a single cylinder engine, the engine speed prediction period or the engine rotation pulsating period, as referred to herein, is a cycle in which the piston travels from, for example, the TDC to the BDC and then returns to the TDC, in other words, a cycle in which the volume of a combustion chamber of a cylinder of the engine 20 is increased and then decreased, or vice versa. The engine 20 of this embodiment has four cylinders. Therefore, when the combustion chamber in any one of the cylinders is compressed, that in another of the cylinders expands. Such a cycle (i.e., a 180° rotation of the crankshaft 22) is defined as one of the engine rotation pulsating periods in this embodiment.

The first calculator assumes that a loss of energy that is a loss of torque of the crankshaft 22 (which will also be referred to as loss energy below) while the engine 20 is rotating in the forward direction during decreasing of the speed thereof, remains constant at the same angular position of the piston of the engine 20. The first calculator defines, as described above, each cycle (i.e., 180° C.A (Crank Angle) in this embodiment) of a change in instantaneous speed of the engine 20 arising from a cycle of increasing and decreasing of the volumes of the combustion chambers of the engine 20 as one of the engine rotation pulsating periods and calculates future values of the speed of the engine 20 in sequence as a function of past values thereof in each of the engine rotating pulsating periods in each of the engine rotation pulsating periods. In other words, the first calculator determines a future speed of the engine 20 based on the fact that when the engine 20 is revolving in the forward direction, torque, as produced by the engine 20, will vary in the same pattern in each successive two of the engine rotation pulsating periods. The above instantaneous speed of the engine 20 is the speed of the engine 20 derived as a function of an amount of time required for the crankshaft 22 to rotate through a given angle. The first calculator, therefore, serves to calculate a predicted value of the instantaneous speed of the engine 20 which would appear at an angle of rotation of the engine 20 (i.e., an angular position of the crankshaft 22) where the crank pulse signal will be next outputted from the crank angle sensor 23, that is, at a subsequent cycle of the calculation in the ECU 30 and then calculate a predicted value of the instantaneous speed of the engine two cycles of the calculation later based on the predicted value in the subsequent cycle of the calculation. In this way, the ECU 30 derives the locus of a change in speed of the engine 20 in a period of time in which the speed of the engine 20 is decreasing.

Specifically, a point which has already been detected by the crank angle sensor 23 or at which the speed of the engine 20 has already been predicted by the rotation calculating means is defined as a reference point P(i). A point for which the speed of the engine 20 will be predicted is defined as a prediction point P(i+1). The speed of the engine 20 (which will also be referred to below as a predicted engine speed Ne(i+1)) at the prediction point P(i+1) in the normal rotation range of the engine 20 is expressed by Eq. (1) below using a loss energy $E_{loss\_p(i \to i+1)}$ occurring between the reference point P(i) and the prediction point P(i+1) in the normal rotation range. Note that the sign of the loss energy which acts in a direction opposite the normal direction of the engine 20 is defined as being positive.

$$Ne(i+1) = \sqrt{Ne(i)^2 - E_{loss\_p(i \to i+1)}}$$

$$(Ne(i) > 0 \text{ and } Ne(i)^2 - E_{loss\_p(i \to i+1)} > 0) \qquad (1)$$

where Ne(i) is the speed of the engine 20 at the reference point P(i), Ne(i+1) is the speed of the engine 20 at the prediction point P(i+1), and $E_{loss\_p(i \to i+1)}$ is a loss energy between the reference point P(i) and the prediction point P(i+1).

The engine control system assumes that the degrees of torque produced by the engine 20 in the adjacent two engine rotation pulsating periods during a fuel cut in the engine 20 are identical with each other at the same crank angles from the TDC as long as the direction of rotation of the engine 20 remains unchanged. The loss energy Eloss_p(i→i+1) in Eq. (1), therefore, uses the loss energy between corresponding crank angles in the previous engine rotation pulsating period.

The above predicting operation is initiated every input of the crank pulse signal from the crank angle sensor 23 to the ECU 30, i.e., every 30° C.A and executed in a period of time until subsequent input of the crank pulse signal, thereby updating the predicted data for use in defining the locus of a change in speed of the engine 20. The predicting operation may alternatively be made by converting the instantaneous values of the speed of the engine 20 into values of angular velocity.

Second Calculator

Next, the prediction of the speed of the engine 20, as made by the second calculator, will be discussed below. The first calculator, as described already, predicts a future speed of the engine 20 on the assumption that the loss energy in the engine 20 after the engine 20 stops burning the fuel will be constant at the same crank angle position, as expressed in terms of the position of the piston of the engine 20, in cycles of rotation of the crankshaft 22, but however, such an assumption is not satisfied in the reverse rotation range of the engine 20. This is because engine torque (which will also be referred to as a loss torque below) developed when the burning of fuel is stopped in the engine 20 usually contains a loss of torque arising from mechanical friction the piston will experience during stroke in the engine 20, and such a torque loss acts on the engine 20 in a direction depending upon the direction of rotation of the engine 20, in other words, in opposite directions between the forward rotation and reverse rotation of the engine 20 (see FIGS. 2(*a*) to 2(*f*)). Specifically, the loss energy in the engine rotation pulsating periods contains a friction component arising from the mechanical friction to which the piston of the engine 20 is subjected during stroke thereof and a compression component resulting from a change in pressure in the cylinder of the engine 20.

In view of the above phenomenon, the engine control system of this embodiment is engineered to break down the loss energy in the engine 20 into the friction component and the compression component and calculate the loss energy in the reverse rotation range of the engine 20 in terms of a difference in direction of action of the friction component on the engine 20. Specifically, the sign of the friction component contained in the loss energy in the engine rotation pulsating period during the normal rotation of the engine 20 is reversed and defined as the value of the friction component of the loss energy in the reverse rotation range of the engine 20. For the compression component, a pumping loss component that is a loss of energy created during the intake stroke of the piston in the engine 20 is calculated and defined as the compression component of the loss energy in the reverse rotation range of the engine 20. The loss energy, as expressed by the sum of the friction component and the compression component, is determined as a predicted value of the loss energy in the reverse rotation range of the engine 20 and used in predicting the speed of the engine 20 in the reverse rotation range.

The reason why the pumping loss component is considered as the compression component of the loss energy will be described below with a P-V diagram in FIGS. 2(*a*) to 2(*f*). FIGS. 2(*c*) to 2(*f*) respectively demonstrate changes in compression energy in a complete combustion cycle, i.e., four strokes: intake stroke, compression stroke, expansion stroke (i.e., combustion stroke), and exhaust stroke of the piston of the engine 20. The intake and compression strokes in FIGS. 2(*c*) and 2(*e*) are strokes of the piston which increase the volume of the combustion chamber of the engine 20, while the compression and exhaust strokes are strokes of the piston which decrease the volume of the combustion chamber of the engine 20. FIGS. 2(*a*) to 2(*f*) illustrate changes in compression energy in the case where the engine 20 is in a single cylinder engine.

An energy drop P1 arising from the pumping loss, as illustrated in FIG. 2(*c*), occurs in the cylinder during the intake stroke. In the cylinder in which the piston is undergoing the compression stroke, a rise Q2 in compression energy, as illustrated in FIG. 2(*d*), occurs with an upward movement of the piston, after which a drop P2 in compression energy takes place. In the cylinder in which the piston is undergoing the expansion stroke, a rise Q3, as illustrated in FIG. 2(*e*), occurs with a downward movement of the piston, after which a drop P3 in compression energy takes place. The pressure in the cylinder in which the piston is undergoing the exhaust stroke is substantially identical with the atmospheric pressure, so that a change in compression energy will be approximately zero. The changes in compression energy during the compression stroke and the expansion stroke, thus, cancel each other, so that the energy drop P1 caused by the pumping loss will be a change in compression energy in all the strokes (i.e., the intake, the compression, the expansion, and the exhaust).

Figure 3:
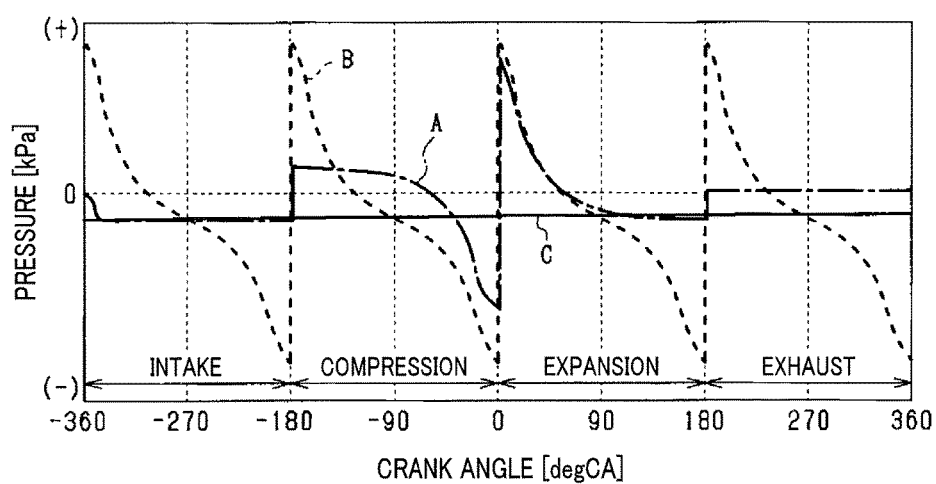
FIG. 3 is a graph which represents a relation between the pressure in a cylinder of an engine and an angular position of a crankshaft of the engine.

FIG. 3 is a graph which illustrates a change in pressure in a cylinder of a single cylinder engine, as indicated by a chain line A, a resultant pressure that is a combination of pressures in all cylinders (i.e., the four cylinders of the engine 20), as indicated by a broken line B, and an average of the resultant pressure in all the cylinders in each stroke, as indicated by a solid line C. Each pressure is expressed on the basis of the atmospheric pressure. The direction in which each pressure acts in the normal rotational direction of the engine is expressed with a plus sign (+). The crank angle is expressed on the basis of a reference position (0° C.A) that is the top dead center in the compression stroke in a selected one of the cylinders (e.g., the first cylinder) of the engine. The graph shows that the average of the resultant pressure in all the cylinders in any of the intake, compression, expansion, and exhaust strokes, as indicated by the solid line C, is identical with the pressure in the intake stroke of the single cylinder engine indicated by the chain line A. This means that resultant compression energy in any of the intake, compression, expansion, and exhaust strokes in all the cylinders of the engine is equal to the energy of the pumping loss in the intake stroke.

This embodiment, therefore, puts the compression component into an arithmetic equation without ignoring the pumping loss to improve in calculating the speed of the engine 20. Specifically, a relation between a compression torque $T_{ec}$ and a pumping loss torque $T_{pomp}$ is expressed by Eq. (3) below. The sum of energy losses in all the cylinders is expressed according to Eq. (4) below using the friction torque $T_{ef}$ and the pumping loss torque $T_{pomp}$. An interval of integration in Eqs. (3) and (4) ranges over all the strokes in the engine (i.e., a sequence of intake, compression, expansion, and exhaust strokes in all the cylinders).

$$\int T_{ec}(\theta)d\theta = \int T_{pomp}(\theta)d\theta \tag{3}$$

$$\Sigma_i^n E_p(i) = \int T_{ef}(\theta)d\theta + \int T_{pomp}(\theta)d\theta \tag{4}$$

where $E_p(i)$ is the energy loss in one stroke, and n indicates the number of the cylinders of the engine in Eq. (4).

How to calculate the speed of the engine 20 in the reverse rotation range will be described below in detail. If a direction opposite the normal rotation direction of the engine 20 is expressed with a plus sign (+), the engine torque $T_e$ [Nm] is expressed by $$T_e = T_{ef} + T_{ec} \tag{5}$$

where $T_{ef}$ is the friction torque, and $T_{ec}$ is the compression torque.

The friction torque $T_{ef\_n}$ during the reverse rotation is given by Eq. (6) below using the friction torque $T_{ef\_p}$ during the normal rotation.

$$T_{ef\_n} = -T_{ef\_p} \tag{6}$$

The friction torque $T_{ef}$ is expressed by Eq. (7) below using the above Eqs. (3) and (5).

$$\int T_e(\theta)d\theta = \int T_{ef}(\theta)d\theta + \int T_{ec}(\theta)d\theta \tag{7}$$

$$T_{ef} = \frac{1}{n}\left[\int T_e(\theta)d\theta - \int T_{ec}(\theta)d\theta\right]$$

If the degree of compression torque in the engine rotation pulsating period is the same at the same crank angle from the TDC, the compression torque $T_{ec\_n}$ during the reverse rotation is expressed by Eq. (8) below using the compression torque $T_{ec\_p}$ during the normal rotation.

$$T_{ec\_n} = T_{ec\_p} = T_e - T_{ef} \tag{8}$$

The engine torque $T_{e\_n}$ during the reverse rotation is, therefore, given by Eq. (9) below using the engine torque $T_{e\_p}$ during the normal rotation.

$$T_{e\_n} = T_{ef\_n} + T_{ec\_n} = -T_{ef\_p} + (T_{e\_p} - T_{ef\_p}) \tag{9}$$

$$= T_{e\_p} - 2 \times T_{ef\_p}$$

Rewriting Eq. (9) using Eqs. (3) and (7), we obtain

The engine torque $T_e$ and the loss energy $E_{loss}$ have a proportional relation to each other, so that Eq. (10) is satisfied if the engine torque $T_e$ is replaced with the loss energy $E_{loss}$. The loss energy $E_{loss\_n}$ during the reverse rotation is expressed by Eq. (11) below. Use of Eq. (11) enables the loss energy $E_{loss\_n}$ during the reverse rotation to be derived using the loss energy $E_{loss\_p}$ during the normal rotation. The loss energy $E_{loss\_p}$ during the normal rotation is determined by an output of the crank angle sensor 23 or the engine speed Ne(i+1) predicted by the first calculator.

$$E_{loss\_n} = E_{loss\_p} - 2/n[\int E_{loss\_p}(\theta)d\theta - \int E_{pomp}(\theta)d\theta] \tag{11}$$

where $E_{loss\_p}$ is the energy loss [rpm²] during the normal rotation, $E_{loss\_n}$ is the loss energy [rpm²] during the reverse rotation, and $E_{pomp}$ is the pumping loss energy [rpm²].

In Eq. (11), the pumping loss energy $E_{pomp}$ is calculated as a function of the pressure in the cylinder in which the piston is undergoing the intake stroke. Specifically, the pumping loss energy $E_{pomp}$ is derived using Eq. (12) below.

$$E_{pomp} = \beta P \tag{12}$$

where P is the pressure in the cylinder in which the piston is undergoing the intake stroke, and β is a conversion factor for use in pressure-to-energy conversion. The pressure P in the cylinder in which the piston is undergoing the intake stroke is derived by an output of the intake pressure sensor 28.

The loss energy $E_{loss\_n}$ during the reverse rotation, as derived in Eq. (11), is used to predict the speed of the engine 20 in the reverse rotation range according to Eq. (13) below.

$$Ne(i+1) = -\sqrt{Ne(i)^2 + E_{loss\_n(i \to i+1)}}$$

$$(Ne(i) > 0 \text{ and } Ne(i)^2 - E_{loss\_n(i \to i+1)} > 0) \tag{13}$$

where Ne(i) is the speed of the engine 20 at the reference point P(i), Ne(i+1) is the speed of the engine 20 at the prediction point P(i+1), and $E_{loss\_n(i \to i+1)}$ represents the loss energy between the reference point P(i) and the prediction point P(i+1) in the reverse rotation range.

In Eq. (13), the loss energy $E_{loss\_n(i \to i+1)}$ is given by a value derived by converting the loss energy $E_{loss\_p}$ between crank angles in the normal rotation range which are respectively identical with the reference point P(i) and the prediction point P(i+1) into the loss energy $E_{loss\_n}$ during the reverse rotation using Eq. (11). Specifically, after the rotation of the engine 20 is changed from the normal direction to the reverse direction, the crank angle of the piston will reverse, so that the speed of the engine 20 sequentially changes to those at the prediction points P(i−3)→P(i−2)→P(i−1)→P(i)→P(i+1)→P(i+2). When the speed of the engine 20 becomes zero at the prediction point P(i−1), the crank angle at the prediction point P(i) immediately after the reverse rotation range is entered will be identical with that at the prediction point P(i−2) in the normal rotation range immediately before the reverse rotation range is entered. The crank angle at the prediction point P(i+1) is also identical with that at the P(i−3). In this case, values of the loss energy created at the same crank angle correspond to each other regardless of the direction of rotation of the engine 20. The value of the loss energy occurring, for example, between the prediction points P(i) and P(i+1) may, therefore, be calculated according to the above Eq. (11) as being equal to the value of the loss energy occurring between the prediction points P(i−3) and P(i−2) in the normal rotation range.

The time interval $\Delta t_{(i \to i+1)}$ between the reference point P(i) and the prediction point P(i+1) is expressed by Eq. (14) below regardless of the direction of rotation of the engine 20. Note that $\Delta \theta_{(i \to i+1)}$ in Eq. (14) is an angle through which the crankshaft 22 rotates from the reference point P(i) to the prediction point P(i+1), that is, the crank resolution.

$$\Delta t_{(i \to i+1)} = 2 \times [\Delta \theta_{(i \to i+1)}/(Ne(i) + Ne(i+1))] \tag{14}$$

Figure 4:
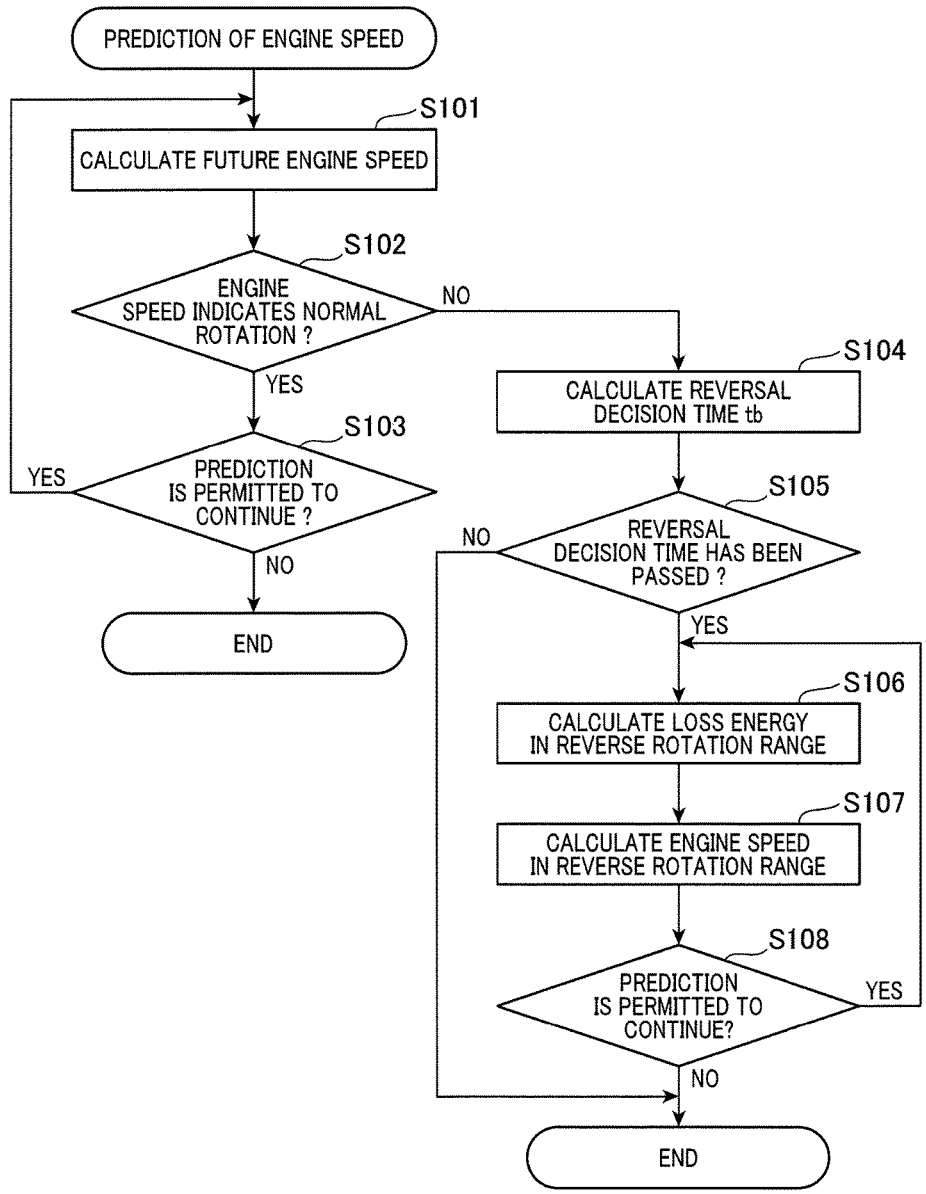
FIG. 4 is a flowchart of an speed prediction program to be executed by the engine control apparatus of FIG. 1.

Next, the operation to calculate the predicted value of the speed of the engine 20 will also be described with reference to a flowchart of FIG. 4. The program or a sequence of logical steps in FIG. 4 is executed by the ECU 30 at an interval of a given angular position of the crankshaft 22 (e.g., every 30° C.A in this embodiment) after stop of the engine upon satisfaction of the automatic engine stop condition.

After entering the program, the routine proceeds to step S101 wherein the loss energy $E_{loss}$, as derived at the last engine rotation pulsating period, is used to calculate or predict the rotational speed Ne(i+1) of the engine 20 at the next rotation pulsating period according to the above Eq. (1) (which is made by the first calculator). The routine proceeds to step S102 wherein it is determined whether the predicted value of the speed Ne(i+1) of the engine 20, as derived in step S101, indicates the fact that the crankshaft 22 is rotating in the normal direction (i.e., the forward direction) or not. Specifically, when $[Ne(i)^2-E_{loss(i \to i+1)}]>0$, the speed Ne(i+1) is determined to have a positive value meaning that the crankshaft 22 is rotating in the normal direction. Alternatively, when $[Ne(i)^2-E_{loss(i \to i+1)}]<0$, the speed Ne(i+1) is determined to have a negative value. If a YES answer is obtained in step S102, then the routine proceeds to step S103 wherein it is determined whether the prediction of the speed of the engine 20 should continue or not, that is, whether the ECU 30 is waiting for a subsequent input of the crank pulse signal from the crank angle sensor 23 or not. If a YES answer is obtained, then the routine returns back to step S101. The first calculator continues to cyclically calculate the predicted value of the speed of the engine 20 through steps S101 and S102.

Alternatively, if a NO answer is obtained in step S102 meaning that the value of the predicted speed Ne(i+1), as calculated last according to Eq. (1), is determined to have been changed to negative, then the routine proceeds to step S104 wherein a reversal decision time tb that is the time when a given speed of the crankshaft 22 (e.g., zero or near-zero speed) is reached is determined based on the predicted speed Ne(i+1), as derived in step S101. The reversal decision time tb is the latest time in a time range where the pinion 11 is enabled to engage the ring gear 21 during the normal rotation of the engine 20. The reversal decision time tb is determined in view of a required travel period of time Tp that is a time required between start of travel of the pinion 11 and contact of the pinion 11 with the ring gear 21.

The routine then proceeds to step S105 wherein it is determined that the current time is later than the reversal decision time tb or not. If a NO answer is obtained meaning that if a request to restart the engine 20 is made now, and the pinion 11 then starts to be thrust, it is possible to bring the pinion 11 into contact with the ring gear 21 during the normal rotation of the engine 20, it is concluded that there is no need for predicting the speed of the engine 20 during the reverse rotation of the engine 20. The routine then terminates.

Alternatively, if a YES answer is obtained in step S105, then the routine proceeds to step S106 wherein the loss energy $E_{loss\_n}$ in the reverse rotation range of the engine 20 is calculated according to Eq. (11), which is achieved by an energy calculator that is one of tasks of the ECU 30. The routine proceeds to step S107 wherein a future speed of the engine 20 in the reverse rotation range is calculated according to Eq. (13) using the loss energy $E_{loss\_n}$ in the reverse rotation range of the engine 20. This is achieved by the second calculator.

The routine proceeds to step S108 wherein it is determined whether the second calculator should continue the prediction of the speed of the engine 20 or not. If a YES answer is obtained, then the routine returns back to step S106. Alternatively, if a NO answer is obtained, then the routine terminates. In this embodiment, a time interval between stop of burning fuel in the engine 20 and when the direction of rotation of the engine 20 first changes from the reverse direction to the normal direction after the stop of burning the fuel in the engine 20 is set to a speed prediction period of time in which the speed of the engine 20 is predicted. Accordingly, in step S108, the speed of the engine 20 is compared with a reference value indicating the end of the speed prediction period of time. If such comparison shows that the time when the direction of rotation of the engine 20 changes from the reverse direction to the normal direction for the first time after the stop of burning the fuel in the engine 20 has passed, a NO answer is obtained in step S108. The routine then terminates.

Figure 5:
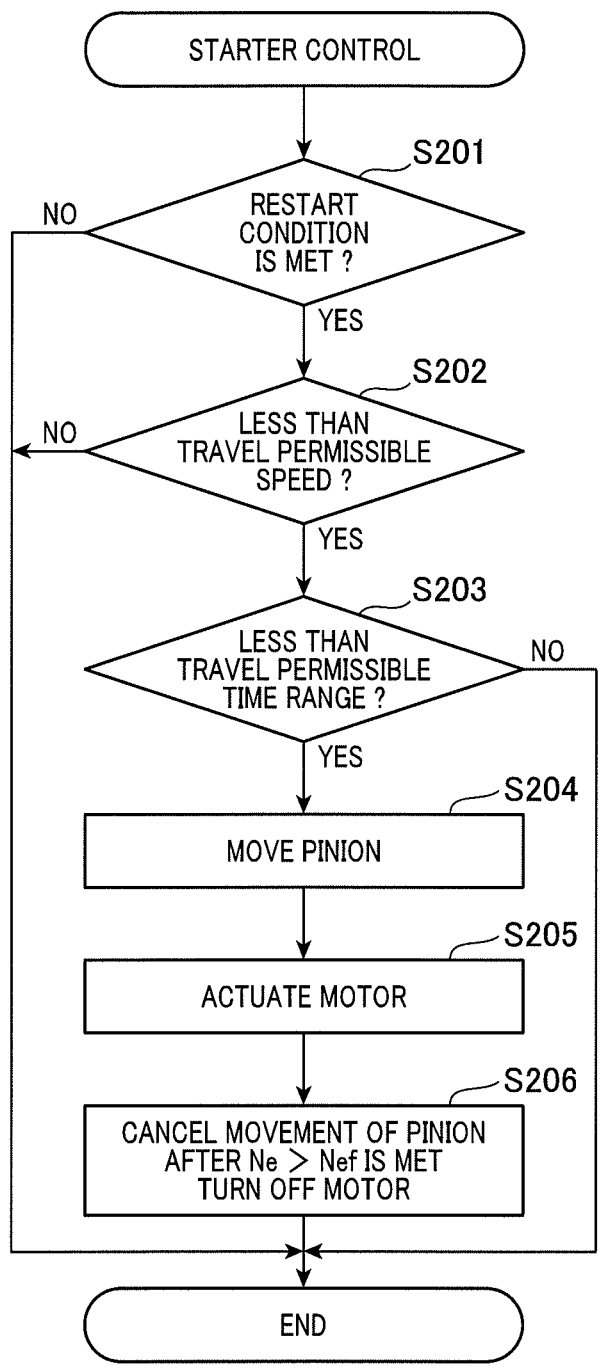
FIG. 5 is a flowchart of a starter control program to control an operation of a starter using a speed of an engine predicted in the program of FIG. 4.

FIG. 5 is a flowchart of a starter control program to control the operation of the starter 10. This program is executed at a given interval by a starter controller (i.e., the ECU 30) in a period of time between stop of combustion of the fuel in the engine 20 upon satisfaction of the above described automatic engine stop condition and stop of rotation of the engine 20.

After entering the program, the routine proceeds to step S201 wherein it is determined whether the automatic engine restart condition has been met or not. If a NO answer is obtained, then the routine terminates. Alternatively, if a YES answer is obtained, then the routine proceeds to step S202 wherein it is determined whether the engine speed is lower than or equal to a pinion travel permissible speed or not. The pinion travel permissible speed is an upper limit of a range of the speed of the engine 20 in which the starter 10 is permitted to move the pinion 11 into contact with the ring gear 21. The pinion travel permissible speed is set to, for example, 100 rpm. The engine speed to be compared with the pinion travel permissible speed is the speed of the engine 20, as predicted by the first calculator in the way described above, but may alternatively be the speed of the engine 20 directly measured by the crank angle sensor 23.

If a NO answer is obtained in step S202, the routine terminates. Alternatively, if a YES answer is obtained in step S202, then the routine proceeds to step S203 wherein it is determined whether a pinion travel permissible time range has been entered or not. The pinion travel permissible time range is a period of time in which the pinion 11 is permitted to mesh with the ring gear 21 within an engine speed range permissible in terms of the gear meshing noise or mechanical wear of the pinion 11 and the ring gear 21. The pinion travel permissible time range is determined accordingly based on the speed of the engine 20, as predicted by the second calculator, in view of a contact inhibition period and the travel time Tp. The contact inhibition period is a period of time in which the pinion 11 is inhibited from being bought into contact with the ring gear 21. The contact inhibition period is set within an engine speed range where the speed of the engine 20 is relatively high in the reverse rotation range.

If a NO answer is obtained in step S203, then the routine terminates. Alternatively, if a YES answer is obtained, then the routine proceeds to step S204 wherein the ECU 30 outputs the on-signal to the pinion drive relay 19 to actuate the starter 10. The starter 10 then thrusts the pinion 11 toward the ring gear 21. The routine then proceeds to step S205 wherein after a lapse of the travel time Tp since the pinion 11 started to be moved, the ECU 30 outputs the on-signal to the motor drive relay 14 to actuate the electric motor 12 to rotate the pinion 11. The travel time Tp is, as described above, a period of time required between when the pinion 11 starts to be moved and when the pinion 11 travels to and contacts with the ring gear 21.

The routine then proceeds to step S206 wherein when the condition where the speed Ne of the engine 20 is higher than an engine start speed Nef (e.g., 400 rpm to 500 rpm) has been met, the ECU 30 outputs the off-signals to the pinion drive relay 19 and the motor drive relay 14 to release the engagement of the pinion 11 with the ring gear 21 and also to stop the motor 12, thus terminating the cranking of the engine 20.

The engine control system of this embodiment offers the following advantages.

The engine control system is, as described above, engineered to reverse the sign (i.e., plus or minus sign) of a value of the friction component that is a portion of the loss energy in the normal rotation range and arises from the mechanical friction to which the piston of the engine 20 is subjected during stroke thereof, calculate the loss energy in the reverser rotation range of the engine 20 as a function of the value of the friction component whose sign has been reversed and the pumping loss component that is an energy loss occurring in the intake stroke of the engine 20, and predict a future speed of the engine 20 in the reverse rotation range as a function of the calculated loss energy. In other words, the engine control system is designed to put the compression component, as contained in the loss energy, into the arithmetic equation without ignoring the pumping loss to improve in predicting the speed of the engine 20. This improves the accuracy in calculating the loss energy in the reverse rotation range of the engine 20, which will result in enhanced accuracy in predicting the speed of the engine 20 in the reverse rotation range.

The engine control system calculates the pumping loss energy $E_{pomp}$ based on the pressure in one of the cylinders in which the piston is undergoing the intake stroke. This results in improved accuracy in determining the pumping loss energy $E_{pomp}$ by measuring the pressure P in the cylinder whose piston is in the intake stroke. Particularly, the pressure in the intake pipe, as measured by the intake pressure sensor 28, is used as the pressure P in the cylinder in calculating the pumping loss energy $E_{pomp}$. The engine control system of this embodiment is, therefore, suitable for use in automotive vehicles which are not equipped with a cylinder pressure sensor.

It is preferable that when an engine restart request is made during a drop in speed of the engine 20 after the fuel combustion of the engine 20 is stopped in response to an automatic engine stop request, the engine 20 is restarted immediately after the engine restart request is made without waiting for a stop of the crankshaft 22, however, the contact of the pinion 11 with the ring gear 22 during a reverse rotation of the crankshaft 22 in a relatively high speed range thereof to achieve engagement of the pinion 11 with the ring gear 21 will lead to a greater concern about an increase in gear meshing noise or acceleration of wear of the pinion 11 or the ring gear 21. In order to alleviate such drawbacks, this embodiment is used with an automatic stop and restart system for vehicles to control or determine the time when the pinion 11 should be moved using the speed of the engine 20, as predicted by the first calculator or the second calculator, through the operations in steps S201 and S202 of FIG. 9, thereby minimizing the gear meshing noise and the wear of the pinion 11 and the ring gear 21 and also permitting the engine 20 to be restarted as quickly as possible after the engine restart request is made.

Particularly, this embodiment is used with a system capable of controlling the movement of the pinion 11 and the actuation of the motor 12 separately, thus enabling the time when the pinion 11 should be moved to be controlled at a high response rate and with an increased accuracy using the speed of the engine 20 predicted by the first calculator or the second calculator. This enables the engine 20 to be restarted without increasing the wear of the pinion 11 and the ring gear 21.

Modifications

The structure or operation of the engine control system may be modified, as described below.

The calculation of the pumping loss energy $E_{pomp}$ uses the pressure in the intake pipe, as measured by the intake pressure sensor 28, as the pressure P in one of the cylinders of the engine 20 in the above embodiment, however, pressure sensors may be provided, one for each cylinder of the engine 20, to directly measure the pressure P. The direct measurement of the pressure P results in an enhanced accuracy in calculating the pumping loss energy $E_{pomp}$.

The above embodiment calculates the pumping loss energy $E_{pomp}$ as a function of the pressure P in one of the cylinders of the engine 20 in which the piston is undergoing the intake stroke, however, it is not limited to such a method. For instance, the pumping loss component may be calculated as a function of the loss energy at an angular position of rotation of the engine 20 where the volume of one of the cylinders of the engine 20 in which the piston is undergoing the compression stroke becomes equal to that of one of the cylinders in which the piston is undergoing the expansion stroke.

At the angular position of rotation of the engine 20 where the volume of one of the cylinders of the engine 20 in the compression stroke is equal to that of one of the cylinders in the expansion stroke, the energy losses in the compression stroke and the expansion stroke cancel each other, so that only the loss energy in the intake stroke, that is, the pumping loss component remains. For example, in the case of a four-cylinder engine, if the top dead center in one of the cylinders (e.g., the first cylinder) in the compression stroke is defined as a reference position (0° C.A), the cylinder in the compression stroke and the cylinder in the expansion stroke are identical in volume thereof with each other at angular positions of −270° C.A, −90° C.A, 90° C.A, and 270° C.A, so that the resultant pressure that is a combination of pressures in all the cylinders, as indicated by the broken line B, is equal to the average of the resultant pressure in all the cylinders in each stroke, as indicated by the solid line C. Based on this fact, the pumping loss component is derived in the above way. Specifically, the loss energy $E_{loss\_p}$ at the crank angle where the volume of the cylinder in the compression stroke is identical with that of the cylinder in the expansion stroke within the normal rotation range is calculated using past history data. The loss energy $E_{loss\_p}$ calculated in this way is used as the pumping loss energy $E_{pomp}$. The loss energy $E_{loss\_n}$ in the reverse rotation range is determined according to the above Eq. (11).

The above embodiment determines a time interval between stop of burning fuel in the engine 20 and when the direction of rotation of the engine 20 first changes from the reverse direction to the normal direction after the stop of burning the fuel in the engine 20 as the speed prediction period of time in which the speed of the engine 20 is predicted, but however, it is not limited to such a time interval. The prediction of the speed of the engine 20 may continue after the direction of rotation of the engine 20 first changes from the reverse direction to the normal direction after the stop of burning the fuel in the engine 20. For instance, the prediction of the speed of the engine 20 may continue until the speed of the engine 20 becomes zero.

The engine control system is equipped with the pinion drive relay 19 which works to energize or deenergize the coil 18 to move the pinion 11 and the motor drive relay 14 which works to energize or deenergize the electric motor 12, but may be designed to have a motor energization control relay. For example, in the structure of FIG. 1, a motor energizing contact is disposed on an end of the plunger 17 opposite an end thereof to which the lever is connected instead of the motor drive relay 14 and the power supply relay 15. The motor energization control relay is disposed between the motor 12 and the battery 16. The motor energization control relay is designed to be closed or turned on to supply the electric power from the battery 16 to the motor 12 when the motor energizing contact is closed by the movement of the plunger 17 which brings the pinion 11 into engagement with the ring gear 22. In other words, the supply of power to the motor 12 starts following or after completion of the movement of the plunger 17. The motor energization control relay may also be designed to be turned on or off in response to an on/off signal outputted from the ECU 30. The ECU 20 may control the operations of the pinion drive relay 19 and the motor energization control relay independently from each other to achieve the engagement of the pinion 11 with the ring gear 21 and the actuation of the motor 12 separately.

The engine control system of the above embodiment, as described above, controls the movement of the pinion 11 and the actuation of the motor 12 separately, however, it may be engineered to start actuating the motor 12 after a lapse of a given period of time since the pinion 11 starts to be moved. The given period of time is constant, which may cause the motor 12 to start to be actuated too early to rotate the pinion 11 when the pinion 11 engages the ring gear 21 during the reverse rotation of the engine 20, so that torque which will act on the crankshaft 22 in the forward rotation (i.e., the normal rotation) is applied to the crankshaft 22 now rotating in the reverse direction, thus resulting in a failure in restarting the engine 20. This accelerates the wear of the pinion 11 and the ring gear 21. The engine control system may also be designed to set an interval between start of movement of the pinion 11 and start of actuation of the motor 12 to be long in order to avoid the actuation of the motor 12 during the reverse rotation of the engine 20, which may result in a delay in response of the system to an engine restart request. The engine control system of the above embodiment is, however, capable of predicting a future speed of the engine 20 during the reverse rotation thereof accurately, thus resulting in decreased wear of the pinion 11 and the ring gear 21 and ensuring the startability of the engine 20.

The engine control system may be designed to use the speed of the engine 20, as derived by the first or second calculator, to estimate a time when the engine 20 will stop rotating and determine a time when the pinion 11 should be moved toward the ring gear 21 so that the pinion 11 will engage the ring gear 21 at the estimated time. The use of the compression component results in an enhanced accuracy in predicting the speed of the engine 20 in the reverse rotation range, thus enabling the pinion 11 to start to be moved immediately after the engine 20 stops rotating, which will minimize the wear of the pinion 11 and the ring gear 21 and also enable the engine restart operation to be initiated as early as possible. Particularly, it is difficult for a conventional starter device which moves the pinion 11 and actuates the motor 12 in sequence to control engagement of the pinion 11 with the ring gear 21 precisely as compared with the starter device 10 which separately controls the movement of the pinion 11 and the actuation of the motor 12. The conventional starter device sometimes has to restart the engine 20 after the engine 20 stops rotating. The engine control system of the above embodiment is, however, capable of eliminating such a drawback.

What is claimed is:

1. An engine control apparatus that predicts a speed of an engine in a period of time between start of a drop in speed of the engine resulting from stop of combustion of fuel in the engine and stop of rotation of the engine, the engine control apparatus comprising:
    an electronic control unit configured to:
        predict a future speed of the engine in a normal rotation range of the engine as a function of a loss energy in a latest one of engine rotation pulsating periods, each of the engine rotation pulsating periods corresponds to a cycle of a change in speed of the engine based on increasing and decreasing a volume of a cylinder of the engine;
        determine and reverse a positive or negative sign of a value of a friction component of the loss energy in the normal rotation range, the friction component being based on mechanical friction on a piston in the cylinder of the engine during stroke of the piston in the cylinder of the engine, the value of the friction component with the sign reversed being the value of the friction component the reverse rotation range;
        calculate a loss energy in the reverse rotation range of the engine as a function of (i) the value of the friction component in the reverse rotation range, and (ii) a pumping loss component that is an energy loss based on a pressure change during an intake stroke of the engine in the reverse rotation range;
        predict a future speed of the engine in the reverse rotation range of the engine based on the loss energy in the reverse rotation range of the engine; and
        automatically stop the engine in response to satisfying a predetermined automatic engine stop condition, and rotate an output shaft of the engine using a starter device to restart the engine in response to a satisfying a predetermined engine restart condition after the engine is automatically stopped; and
    a starter controller controlling a time at which the starter device is energized based on either: (i) the predicted future speed of the engine in a normal rotation range of the engine, or (ii) the predicted future speed of the engine in the reverse rotation range of the engine.

2. The engine control apparatus as set forth in claim 1, further comprising a pressure determiner which determines a pressure in the cylinder of the engine in which the piston is undergoing the intake stroke, wherein the electronic control unit determines the pumping loss component as a function of the determined pressure in the cylinder, as derived by the pressure determiner.

3. The engine control apparatus as set forth in claim 1, wherein:
    the engine is a multi-cylinder engine, and
    the electronic control unit determines the pumping loss component as a function of a loss energy at an angular position of rotation of the engine where a volume of one of cylinders of the engine in which a piston is undergoing a compression stroke is equal to a loss energy at an angular position of rotation of the engine where a volume of one of the cylinders in which a piston is undergoing an expansion stroke.

\* \* \* \* \*